US010067491B2

United States Patent
Wingky et al.

(10) Patent No.: US 10,067,491 B2
(45) Date of Patent: Sep. 4, 2018

(54) AUTOMATED DRILLING CONTROLLER INCLUDING SAFETY LOGIC

(71) Applicant: Schlumberger Technology Corporation, Sugar land, TX (US)

(72) Inventors: Mochammad Faisal Wingky, Garches (FR); Thierry Lemaout, Carnoet (FR); Jean-Marc Guy Fichet, Lotissement les Pins Puérats (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 834 days.

(21) Appl. No.: 14/507,771

(22) Filed: Oct. 6, 2014

(65) Prior Publication Data

US 2015/0105914 A1   Apr. 16, 2015

Related U.S. Application Data

(60) Provisional application No. 61/889,285, filed on Oct. 10, 2013.

(51) Int. Cl.
| | |
|---|---|
| *G05D 13/00* | (2006.01) |
| *G05B 19/042* | (2006.01) |
| *G05B 15/02* | (2006.01) |
| *E21B 44/00* | (2006.01) |

(52) U.S. Cl.
CPC .......... *G05B 19/0428* (2013.01); *E21B 44/00* (2013.01); *G05B 15/02* (2013.01); *G05B 2219/24001* (2013.01)

(58) Field of Classification Search
None
See application file for complete search history.

(56) References Cited

U.S. PATENT DOCUMENTS

| | | | | |
|---|---|---|---|---|
| 4,626,984 | A * | 12/1986 | Unruh | A01G 25/16 239/69 |
| 6,315,062 | B1 * | 11/2001 | Alft | E21B 7/046 166/255.2 |
| 6,519,568 | B1 | 2/2003 | Harvey et al. | |
| 6,629,572 | B2 | 10/2003 | Womer et al. | |
| 6,944,547 | B2 | 9/2005 | Womer et al. | |
| 7,026,950 | B2 | 4/2006 | Guggari et al. | |
| 7,677,331 | B2 | 3/2010 | Lowe et al. | |
| 8,131,510 | B2 | 3/2012 | Wingky et al. | |

(Continued)

OTHER PUBLICATIONS

International Search Report and Written Opinion issued for International Application No. PCT/US2014/059590, dated Jan. 19, 2015, 8 Pages.

*Primary Examiner* — Rongfa Philip Wang
(74) *Attorney, Agent, or Firm* — Rachel E. Greene; Chadwick Sullivan

(57) ABSTRACT

An automated drilling rig control system in which one or more intelligent algorithms are in two-way communication with a rig control system and are configured to provide continuous external control over the a rig control system includes a safety logic module deployed between the intelligent algorithms and the rig control system. The safety logic module is configured to automatically close a communication pathway between the intelligent algorithms and the rig control system thereby preventing the intelligent algorithms from controlling the rig control system when an unsafe condition is detected.

14 Claims, 2 Drawing Sheets

(56) References Cited

U.S. PATENT DOCUMENTS

| | | | |
|---|---|---|---|
| 8,387,720 B1* | 3/2013 | Keast | E21B 44/00 175/24 |
| 2010/0147589 A1 | 6/2010 | Wingky | |
| 2011/0162888 A1 | 7/2011 | McHugh et al. | |
| 2012/0138362 A1 | 6/2012 | Koederitz et al. | |
| 2013/0146358 A1 | 6/2013 | Disantis et al. | |
| 2013/0231781 A1 | 9/2013 | Chapman | |
| 2013/0231787 A1* | 9/2013 | Chapman | E21B 44/00 700/282 |

* cited by examiner

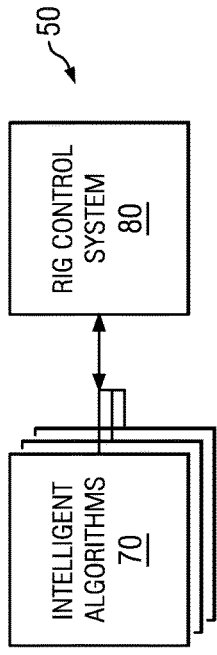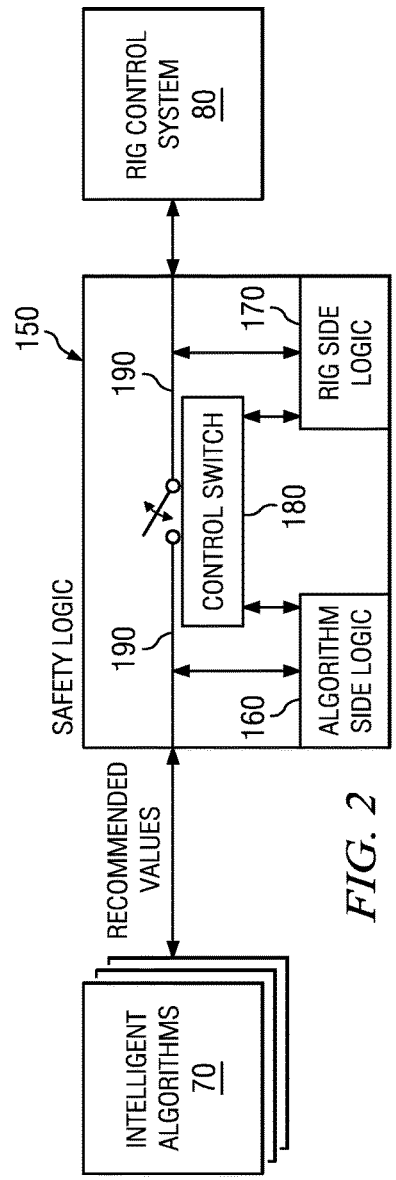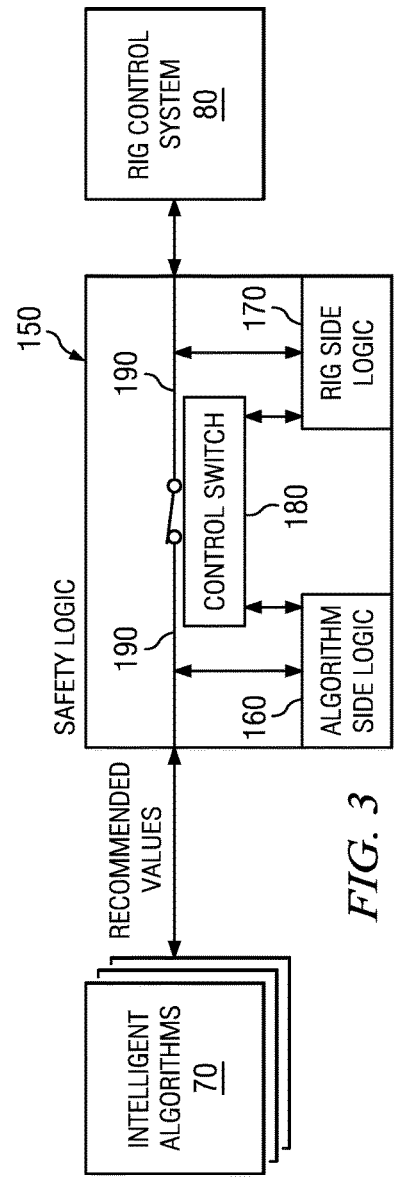

AUTOMATED DRILLING CONTROLLER INCLUDING SAFETY LOGIC

CROSS REFERENCE TO RELATED APPLICATIONS

This application claims the benefit of U.S. Provisional Application Ser. No. 61/889,285 entitled Automated Drilling Controller Including Safety Logic, filed Oct. 10, 2013.

FIELD OF THE INVENTION

Disclosed embodiments relate generally to automated drilling control systems and more particularly to an automated drilling control system including a safety logic module.

BACKGROUND INFORMATION

The use of automated drilling systems and methods is becoming increasing common in drilling subterranean wellbores. Such systems may employ local or remote control of the drilling operation. Moreover, multiple drilling operations may be connected by an intranet or a secure internet connection to enable a single system to control the multiple drilling operations. The drilling systems and/or methods may be employed, for example, to control the speed and/or the direction of drilling. The drilling systems and/or methods may be responsive to automated feedback (such as sensor measurements made during drilling) and may employ sophisticated intelligent algorithms to interpret and respond to the feedback. The feedback may include substantially any measurements made while drilling such as measurement while drilling (MWD) and logging while drilling (LWD) measurements in combination with other surface sensor measurements.

While such automated systems may improve the efficiency of the drilling operations and reduce borehole tortuosity, there remains a need in the art for improved systems; in particular systems and methods that improve the overall safety of the drilling operation especially when externally controlled using intelligent algorithms.

SUMMARY

An automated system for drilling a subterranean wellbore is disclosed. The system includes a safety logic module (e.g., a software or firmware module) deployed between (or in a communication pathway between) at least one intelligent algorithm and a drilling rig control system. The safety logic is configured to enable continuous external control of the drilling rig by the intelligent algorithms under normal operating procedures. The safety logic is further configured to return control of the drilling rig to a local drilling operator when certain predetermined conditions are met thereby improving the safety of the operation. The safety logic may also be configured to enable the local drilling operator to override the intelligent algorithms and take control of the rig at any time (and for any reason).

The disclosed embodiments may provide various technical advantages. For example, the disclosed embodiments tend to improve the safety of automated drilling systems. The disclosed embodiments may further improve the responsiveness of the automated drilling system to a local drilling operator. The safety logic may be configured such that automatic control of the drilling operation may only be initiated (or resumed after an interruption) with permission from the local drilling operator. In such embodiments, outside control of the drilling operation cannot be automatically initiated.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 1 depicts a prior art drilling control system.

FIG. 2 depicts a schematic of one example of a disclosed drilling control system.

FIG. 3 depicts the system of FIG. 2 when a drilling operation is under full continuous control by the intelligent algorithms.

DETAILED DESCRIPTION

Figure 4:
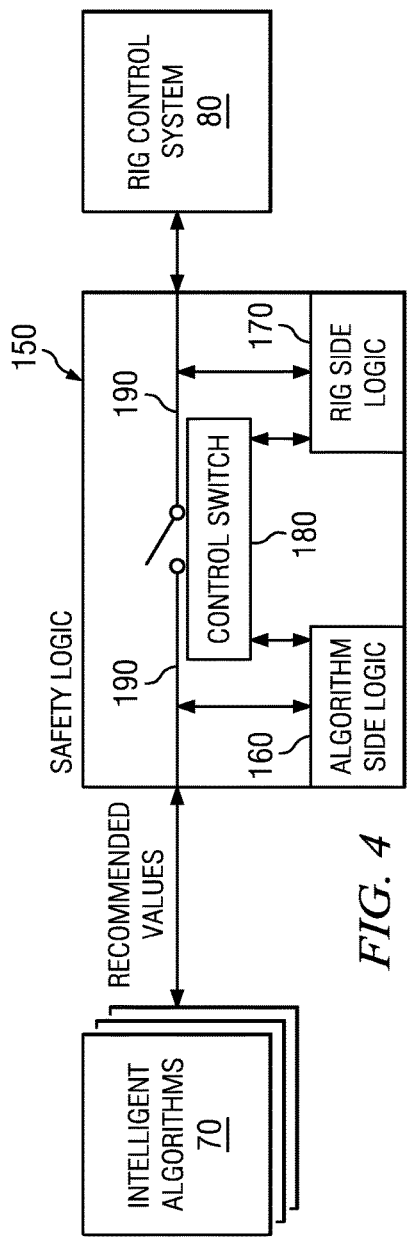
FIG. 4 depicts the system of FIG. 2 when the continuous control has been interrupted and the drilling operation returned to local control.

FIG. 1 depicts a prior art drilling control system 50 for providing automated control of a drilling operation. Such prior art systems commonly employ intelligent algorithms 70 in direct communication with the rig control system (or systems) 80. In general the automated control of the drilling process may only be interrupted manually, for example, by the drilling operator. Examples of automated drilling systems are disclosed in U.S. Pat. No. 8,131,510 and U.S. Patent Publication 2013/0231787, each of which is incorporated by reference herein in its entirety.

FIG. 2 depicts a schematic of one example of a disclosed drilling control system 100. Drilling control system 100 includes a safety logic module 150 deployed between one or more intelligent algorithms 70 and one or more rig control systems 80. The intelligent algorithms 70 may include substantially any suitable algorithms that are configured to control the rig control systems 80. For example, the intelligent algorithms may include automated pay-zone steering algorithms that are configured to steer the direction of drilling in response to real time logging while drilling measurements. The intelligent algorithms may alternatively and/or additionally include algorithms that are configured to steer the direction of drilling based on real time surveying (e.g., measurement while drilling) measurements. The intelligent algorithms may further include algorithms for controlling the top drive rotary speed, the weight on bit, and/or the mud pump fluid flow rate (or pressure) based on various sensor measurements (e.g., such as the aforementioned LWD and/or MWD measurements, drilling dynamics measurements, or various surface measurements). For example, in one embodiment, the intelligent algorithms are configured to provide recommended parameter values (e.g., recommenced rotary speed, weight on bit, drilling fluid pump rate, steering commands, etc.) to the rig control system. It will be understood that the disclosed embodiments are not limited to the use of any particular intelligent algorithms.

The rig control system (or systems) 80 may include substantially any suitable systems. For example, the rig control system 80 may include an integrated control system that provides central control over one or more elements of the drilling system, e.g., including the top drive, the rotary table, the mud pumps, the hoisting system, telemetry systems for communicating with the bottom hole assembly, and the like. When an integrated control system is utilized, the system may be configured such that the intelligent algorithms communicate directly with the integrated control system. The rig control system 80 may also employ a distributed system in which each of the individual elements of the drilling system includes a stand-alone controller. In such embodiments the system may be configured such that the intelligent algorithms communicate directly with each of the distributed controllers. In one embodiment the rig control system (or systems) are configured to receive and implement the recommended values from the intelligent algorithms as well as to provide set point values and various feedback and sensor data back to the intelligent algorithms. It will be understood that the disclosed embodiments are not limited to the use of any particular rig control system so long as the rig control system permits automated control of the drilling operations.

The safety logic module 150 includes first and second logic modules 160 and 170; an algorithm side logic module 160 in communication with the intelligent algorithms 70 and a rig side logic module 170 in communication with the rig control system 80. The logic modules 160 and 170 are in further communication with a control switch 180 that is configured to selectively connect and disconnect the intelligent algorithms 70 and the rig control system 80 from communicating with one another through the communication pathway (channel) 190. When the switch is closed (as described in more detail below with respect to FIG. 3) the pathway 190 is connected so that communication is established between the intelligent algorithms 70 and the rig control system 80 thereby enabling the intelligent algorithms to have full and continuous control over the drilling operation. When the switch is opened (as described in more detail below with respect to FIG. 4) the pathway 190 is connected so that communication between the intelligent algorithms 70 and the rig control system 80 is interrupted thereby returning control of the drilling rig over to the rig control system 80 (and the drilling operator).

The algorithm side logic module 160 is configured to communicate with the intelligent algorithms 70 to monitor whether the intelligent algorithms are functioning properly. For example, the algorithm side logic module 160 may be configured to receive a "heartbeat" from the intelligent algorithms 70 at some predetermined time interval (e.g., one heartbeat per second or one heartbeat per minute). Likewise, the algorithm side logic module 160 may alternatively be configured to execute an electronic handshake with the intelligent algorithms 70 at some predetermined time interval to confirm two-way communication. A failure to receive a heartbeat or properly execute an electronic handshake may be taken to indicate a fault in the function of the intelligent algorithms. The algorithm side logic 160 may thus be configured to open the control switch 180 thereby breaking the communication pathway 190 and disconnecting the intelligent algorithms from the rig control system. This action prevents the intelligent algorithms from controlling the drilling operation and is intended to return control of the drilling operation to the rig control system 80 and/or the drilling operator.

The algorithm side logic module 160 may be further configured to evaluate the recommended values transmitted from the intelligent algorithms 70 to the rig control system 80 to ensure that the recommended values are within predetermined limits. Detection of recommended values outside the predetermined limits may also be indicative of a fault in the intelligent algorithms. In such instances the algorithm side logic module 160 may also be configured to open the control switch 180.

The rig side logic module 170 is configured to communicate with the rig control system 80 to monitor whether the rig control system (or systems) is functioning properly. For example, the rig side logic module 170 may be configured to receive a heartbeat from or execute an electronic handshake with the rig control system at some predetermined time interval (e.g., every second). A failure to receive the heartbeat or properly execute the handshake may be taken to indicate a fault in the function of the rig control system. The rig side logic module 170 may thus be configured to open control switch 180 thereby disconnecting the intelligent algorithms from the rig control system. As stated above, this action prevents the intelligent algorithms from controlling the drilling operation and is intended to return control of the rig to the rig control system 80 (and the drilling operator).

The rig side logic module 170 may also be configured to be responsive to manual intervention by the drilling operator. For example, the rig side logic module 170 may be configured to enable a drilling operator to manually override the intelligent algorithms 70 and to take control of the drilling operation. The rig side logic module 170 may be further configured to allow a drilling operator to manually turn control of the drilling operation over to the intelligent algorithms 70.

FIG. 3 depicts the drilling control system of FIG. 2 when a drilling operation is under full continuous control by the intelligent algorithms. In the depicted embodiment, the control switch 180 is closed, thereby connecting the intelligent algorithms with the rig control system through communication pathway 190 and enabling direct two-way communication between the intelligent algorithms 70 and the rig control system 80. The safety logic module is configured to provide for such full continuous control of the drilling operation until the algorithm side logic module 160 and/or the rig side logic module 170 instructs the control switch 180 to open, thereby interrupting the communication between the intelligent algorithms in the rig control system and returning control of the drilling operation to the right control system (and the drilling operator). Absent any faults to the intelligent algorithm and/or the rig control system or a drilling operator intervention, full continuous control of the drilling operation may continue indefinitely.

FIG. 4 depicts the system of FIG. 2 when the continuous control has been interrupted and the drilling operation returned to local control (i.e., control by the local rig control system and drilling operator). In the depicted embodiment, the control switch 180 is open, thereby disconnecting the intelligent algorithms 70 from the rig control system 80 (and interrupting communication therebetween). In such a configuration the drilling operation is under local control. As described above such local control may be necessitated due to a fault in the intelligent algorithms and/or a fault in the rig control system. For example, a failure to detect either system may result in such a fault. The control switch 180 may also be opened in response to manual intervention by the drilling operator. In general, closing the control switch 180 (to connect the intelligent algorithms with the rig control system) requires manual intervention.

Figure 5:
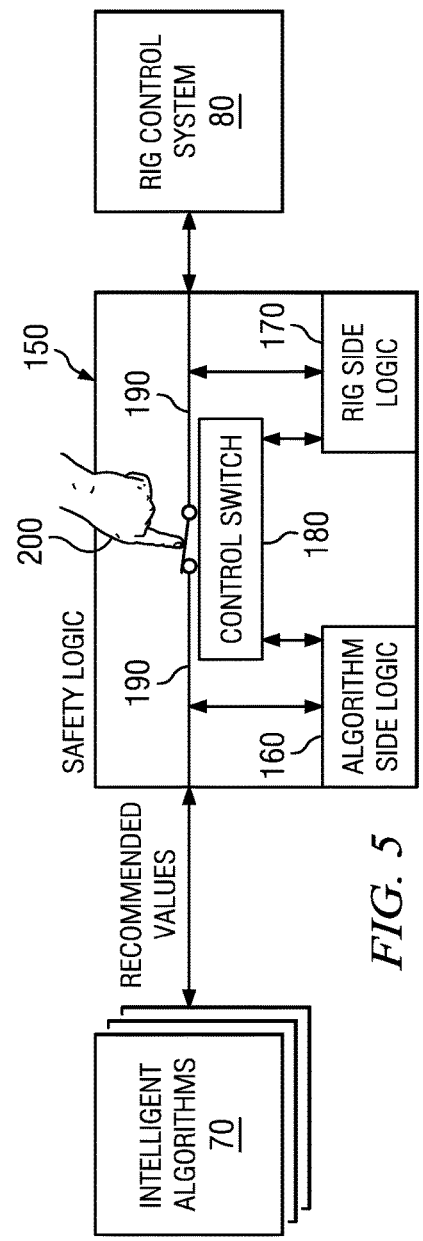
FIG. 5 depicts the system of FIG. 2 in which the safety logic may be manually switched from local to automatic control.

FIG. 5 depicts the system of FIG. 2 in which the control switch 180 is configured to also allow manual control by the drilling operator (manual control is indicated at 200). Such manual control is not intended to override the intelligent algorithms 70, the algorithm side logic module 160, the rig control system 80, and the rig side logic module 170, but rather to enable the operator 200 to manually connect and disconnect the intelligent algorithms and the rig control system as desirable.

It will be understood by those of ordinary skill in the art that the deployments illustrated in FIGS. 2-5 are merely examples. It will be further understood that these disclosed examples are not limited to use with any particular type of drilling rig (so long as the rig is equipped for automated control of certain drilling processes). For example, the disclosed examples are equally well suited for use with substantially any kind of subterranean drilling operation, either offshore or onshore or any other surface equipment related to drilling activities. In embodiments in which the automated system controls a direction of drilling the bottom hole assembly may employ a steering tool such as a rotary steerable tool. Various rotary steerable tools are known in the art, for example, including the Schlumberger PowerDrive® rotary steerable systems.

It will be further understood that the above described automated control systems may be implemented in various ways. For example, these systems may be implemented in hardware, software, firmware, middleware, scripting language, and/or microcode with program code or code segments to perform particular tasks being stored in a machine readable medium such as a storage medium. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, programmable logic controllers (PLCs), programmable automation controllers (PACs), other electronic units designed to perform the functions described above, and/or a combination thereof.

The hardware may be located remotely (away from the rig site) and/or locally (at the rig site). For example, the intelligent algorithms and the algorithm side logic module of the safety logic module may be located remotely and connected to the drilling rig via intranet or a secure internet connection. The rig control system (or systems) and the rig side logic module of the safety logic module may be located locally at the rig site. The disclosed embodiments are, of course, not so limited as the intelligent algorithms and the safety logic module may be located entirely remotely or entirely locally.

For a firmware and/or software implementation, the methodologies may be implemented with modules (e.g., procedures, functions, and so on) that perform the functions described above. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Although an automated rig control system including safety logic and certain advantages thereof has been described in detail, it should be understood that various changes, substitutions and alternations can be made herein without departing from the spirit and scope of the disclosure as defined by the appended claims.

What is claimed is:

1. An automated drilling rig control system comprising:
   a rig control system configured to control operation of a drilling rig;
   one or more intelligent algorithms in two-way communication with the rig control system across a communication pathway, the intelligent algorithms configured to provide continuous external control over the rig control system; and
   a safety logic module deployed between and in communication with the intelligent algorithms and the rig control system, the safety logic module configured to automatically disconnect the intelligent algorithms from the rig control system thereby preventing the intelligent algorithms from controlling the operation of the drilling rig when an unsafe condition is detected.

2. The automated system of claim 1, wherein:
   connecting the intelligent algorithms with the rig control system through the communication pathway enables the intelligent algorithms to control the operation of the drilling rig; and
   disconnecting the intelligent algorithms from the rig control system prevents the intelligent algorithms from controlling the operation of the drilling rig.

3. The automated system of claim 1, wherein the safety logic module comprises:
   an algorithm side logic module in communication with the intelligent algorithms;
   a rig side logic module in communication with the rig control system; and
   a control switch configured to selectively connect and disconnect the intelligent algorithms and the rig control system from one another.

4. The automated system of claim 3, wherein the algorithm side logic module is configured to communicate with the intelligent algorithm at a predetermined time interval.

5. The automated system of claim 4, wherein the algorithm side logic module is configured to open the control switch when communication is broken between the intelligent algorithms and the algorithm side logic module thereby disconnecting the intelligent algorithms from the rig control system, said opening of the control switch operative to prevent the intelligent algorithms from controlling the operation of the drilling rig.

6. The automated system of claim 3, wherein the rig side logic module is configured to communicate with the rig control system at a predetermined time interval.

7. The automated system of claim 6, wherein the rig side logic module is configured to open the control switch when communication is broken between the rig control system and the rig side logic module thereby disconnecting the intelligent algorithms from the rig control system, said opening of the control switch operative to prevent the intelligent algorithms from controlling the operation of the drilling rig.

8. The automated system of claim 3, wherein the rig side logic module is configured to open the control switch, thereby disconnecting the intelligent algorithms from the rig control system, when instructions are received from a drilling operator.

9. The automated system of claim 2, wherein manual intervention is required to close the control switch, thereby connecting the intelligent algorithms with the rig control system and turning control of the drilling rig over to the intelligent algorithms.

10. In an automated drilling rig control system in which one or more intelligent algorithms are in two-way communication with a rig control system and are configured to provide continuous external control over the a rig control system, the automated drilling rig control system comprising a safety logic module deployed between the intelligent algorithms and the rig control system, the safety logic module configured to automatically disconnect the intelligent algorithms from the rig control system when an unsafe condition is detected, thereby preventing the intelligent algorithms from controlling the rig control system.

11. The automated system of claim 10, wherein the safety logic module comprises:
   an algorithm side logic module in communication with the intelligent algorithms;
   a rig side logic module in communication with the rig control system; and
   a control switch configured to selectively connect and disconnect the intelligent algorithms and the rig control system from one another.

12. The automated system of claim 11, wherein the algorithm side logic module is configured to:
   communicate with the intelligent algorithm at a predetermined time interval; and
   open the control switch when communication is broken between the intelligent algorithms and the algorithm side logic module thereby disconnecting the intelligent algorithms from the rig control system, said opening of the control switch operative to prevent the intelligent algorithms from controlling the rig control system.

13. The automated system of claim 11, wherein the rig side logic module is configured to:
   communicate with the rig control system at a predetermined time interval; and
   open the control switch when communication is broken between the rig control system and the rig side logic module thereby disconnecting the intelligent algorithms from the rig control system, said opening of the control switch operative to prevent the intelligent algorithms from controlling the rig control system.

14. The automated system of claim 11, wherein manual intervention is required to close the control switch, thereby connecting the intelligent algorithms with the rig control system and turning control of the drilling rig over to the intelligent algorithms.

\* \* \* \* \*